(12) United States Patent
Hauer

(10) Patent No.: US 6,214,484 B1
(45) Date of Patent: Apr. 10, 2001

(54) FUEL CELL ARRANGEMENT HAVING A METHANOL REFORMER WITH AN ENERGY STORAGE UNIT AND METHOD FOR CONTROLLING THE ENERGY FLOW OF THE FUEL CELL ARRANGEMENT

(75) Inventor: Karl-Heinz Hauer, Braunschweig (DE)

(73) Assignee: Volkswagon AG, Wolfsburg (DE)

( * ) Notice: Subject to any disclaimer, the term of this patent is extended or adjusted under 35 U.S.C. 154(b) by 0 days.

(21) Appl. No.: 09/454,638

(22) Filed: Dec. 6, 1999

Related U.S. Application Data

(63) Continuation of application No. PCT/EP98/03154, filed on May 28, 1998.

(30) Foreign Application Priority Data

Jun. 6, 1997 (DE) ............................................. 197 23 746

(51) Int. Cl.$^7$ .......................... H01M 8/04; H01M 16/00
(52) U.S. Cl. ................................. 429/9; 429/13; 429/23; 180/653
(58) Field of Search .................................. 429/9, 23, 25, 429/13; 320/101; 180/65.3

(56) References Cited

U.S. PATENT DOCUMENTS

| 4,000,003 | * | 12/1976 | Baker et al. . | |
| 4,839,574 | * | 6/1989 | Takabayashi | 429/23 X |
| 4,883,724 | * | 11/1989 | Yamamoto | 429/23 |
| 4,904,548 | * | 2/1990 | Tajima | 429/23 X |
| 5,139,894 | * | 8/1992 | Mizuno et al. | 429/9 |
| 5,154,986 | * | 10/1992 | Takechi et al. | 429/23 |
| 5,334,463 | * | 8/1994 | Tajima et al. | 429/9 |
| 5,631,532 | * | 5/1997 | Azuma et al. . | |

OTHER PUBLICATIONS

Abstract of JP 63–236269 published Oct. 3, 1988.

Abstract of JP 02–168803 published Jun. 28, 1990.

Nadal et al., "Development of Hybrid Fuel Cell/Battery Powered Electric Vehicle", Int'l Jour. Of Hydrogen Energy, vol. 21, No. 6, (Jun. 1, 1996).

* cited by examiner

*Primary Examiner*—Stephen Kalafut
(74) *Attorney, Agent, or Firm*—Baker Botts L.L.P.

(57) ABSTRACT

In the fuel cell arrangement disclosed in the specification, a fuel cell stack having a methanol reformer is connected in parallel with an electrical energy storage device, a charge condition detector detects the charge condition of the electrical energy storage device, and a control unit controls the operation of the fuel cell in accordance with the charge condition of the electrical energy storage device.

9 Claims, 1 Drawing Sheet

FUEL CELL ARRANGEMENT HAVING A METHANOL REFORMER WITH AN ENERGY STORAGE UNIT AND METHOD FOR CONTROLLING THE ENERGY FLOW OF THE FUEL CELL ARRANGEMENT

REFERENCE TO RELATED APPLICATION

This application is a continuation of International Application No. PCT/EP98/03154 filed May 28, 1998

BACKGROUND OF THE INVENTION

This invention relates to fuel cell arrangements having a fuel cell with a preceding methanol reformer and an energy reservoir connected in parallel with the fuel cell, and to methods for controlling the energy flow of such arrangements.

Fuel cell arrangements are known in particular as low-emission power sources in the field of motor vehicles. In such arrangements methanol, contained in a tank like conventional fuel, is converted into electrical energy which drives an electric motor by a fuel cell with a methanol reformer. To produce a sufficiently high voltage, a plurality of such fuel cells are operated in series, providing a fuel cell "stack". Because a fuel cell can only be run up slowly into its operating state, an energy reservoir, for example a battery connected in parallel, serves as starting aid and as a power buffer to deal with peak power demands in the system. A disadvantage of this method is poor efficiency with low propulsion output demand i.e., a low partial load and a fully charged battery.

SUMMARY OF THE INVENTION

Accordingly, it is an object of the present invention to provide a fuel cell arrangement and a method for controlling a fuel cell arrangement which overcome disadvantages of the prior art.

Another object of the invention is to provide a fuel cell arrangement with a fuel cell having a methanol reformer an energy reservoir connected in parallel with the fuel cell and a method of controlling that arrangement so as to operate the system at a high level of energy utilization.

These and other objects of the invention are attained by providing a fuel cell arrangement including a fuel cell having a methanol reformer and an associated electrical energy reservoir connected in parallel with the fuel cell, along with a charge condition sensor by which the charge condition of the energy reservoir is detected and a control unit which controls the fuel cell in accordance with the charge condition of the energy reservoir, and including a boost adjustor connected in parallel with the outputs of the fuel cell and the energy reservoir. This permits dynamic changes in the output demand to be satisfied only by the energy reservoir while allowing the fuel cell to operate statically at an optimum point so that the energy utilization of the system is enhanced considerably.

BRIEF DESCRIPTION OF THE DRAWING

Further objects and advantages of the invention will be apparent from a reading of the following description in conjunction with the accompanying single drawing figure which is a block diagram schematically illustrating a representative embodiment of a fuel cell stack with a methanol reformer and an energy reservoir connected in parallel for an electric drive in accordance with the invention.

DESCRIPTION OR PREFERRED EMBODIMENT

Figure 1:
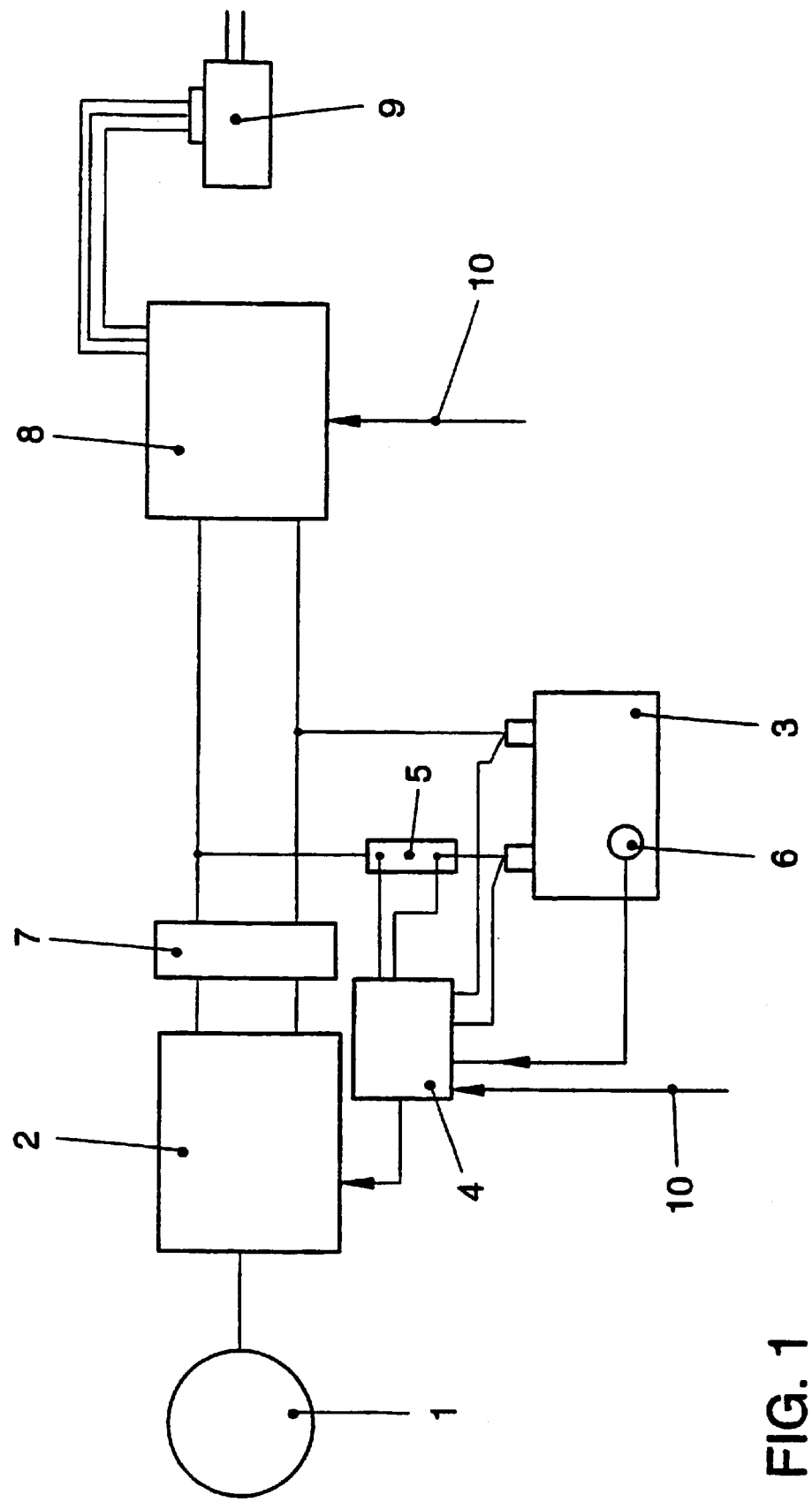

In the typical embodiment of the invention shown in the drawing, a fuel cell arrangement includes a methanol tank 1, a fuel cell 2, which may be a fuel cell stack having a preceding methanol reformer, an energy reservoir 3, a control unit 4, a current measuring instrument 5, a temperature sensor 6, a boost adjuster 7 and a drive control 8 for a motor 9. The drive control 8 receives a control parameter 10, such as a gas pedal position signal, from which the drive control 8 determines a required drive condition.

The methanol tank 1 supplies methanol to the methanol reformer in the fuel cell in the appropriate quantity required for fuel cell operation. An energy reservoir 3 such as a battery or supercondenser, is connected in parallel with the fuel cell 2. Because of the parallel connection, the voltage outputs of the fuel cell 2 and the energy reservoir 3 must be matched to each other but, in order to obtain more latitude in the choice of conventional energy reservoirs 3, the boost adjuster 7 is connected in parallel between the fuel cell 2 and the energy reservoir 3 so that the voltage output of the fuel cell 2 can be adapted to that of the energy reservoir 3. To detect the charge condition of the energy reservoir 3, a current measuring instrument 5 is connected in series with the output of the reservoir. The current measuring instrument may be, for example, a "shunt" or current converter. The output terminals of the current measuring instrument 5 and the terminals of the energy reservoir 3 are connected to the control unit 4 which determines the charge and load condition of the reservoir 3 from measured current and voltage. In principle, the charge condition determination may be made by any method capable of detecting the charge condition of the energy reservoir 3. For a battery, this may, for example, be a determination of acid density, cell voltage or integrated output current. Further, the temperature sensor 6, which is associated with the energy reservoir 3, likewise provides an output signal to the control unit 4.

The fuel cell 2 is preferably operated statically, i.e., at constant power output, at its operating point, thereby providing optimum efficiency, as long as the charge condition of the energy reservoir 3 is above a certain threshold value. If the drive control 8 receives a control parameter 10, derived, for example, from the gas pedal position, which signifies an increased output demand for the motor 9, then the additional power required is drawn exclusively from the energy reservoir 3. In this regard, the fuel cell 2 normally delivers a constant basic power output, whereas the energy reservoir 3 provides any additional power required to respond to a peak load. If, on the other hand, the charge condition of the energy reservoir is lower than a certain threshold, then the control unit 4 boosts the output of the fuel cell 2, i.e. the power yield of the fuel cell 2 is increased to a higher level to supply electrical charge to the energy reservoir until the charge condition of the reservoir exceeds that threshold. When the charge condition of the energy reservoir 3 has increased to a level above the threshold, the control unit 4 restores the output of the fuel cell 2 back to the original point of operation. The introduction of a hysteresis in this process to avoid oscillation about the threshold value is expedient. The original threshold point of operation may also be the normal fuel cell power output point.

Since overcharging of the energy reservoir 3 may impair its function, a second, higher threshold value for the charge condition of the energy reservoir 3 is preferably provided and when that threshold value is exceeded, the operation of the fuel cell 2 is reduced or shut down entirely for a short time until the optimal charge condition of the reservoir 3 has been restored. Possible threshold levels for the reservoir charge condition are, for example, 70% of maximum storage level for the first threshold and 90% of maximum storage level for the second threshold. The control of the energy flow as described above with relation to the threshold levels is independent of the parameter 10 input to the drive control.

If the control unit 4 receives a signal from the temperature sensor 6 indicating that an upper temperature limit of the energy reservoir has been exceeded, the output of the methanol reformer and fuel cell arrangement can be reduced and, if necessary, regulated down to zero.

However, in order to render control of the fuel cell arrangement more forward-looking, or to provide a certain margin of safety, the parameter 10 is preferably not disregarded entirely. Since a margin of safety is necessary, especially in processes of acceleration or travel at extreme high speed, signals indicating such operating conditions are derived by the control unit 4 from the parameter 10 and the operating point of the fuel cell 2 is boosted independently of the charge condition of the energy reservoir 3 in order to assure a supply of adequate power to the drive motor 9. To detect such operating conditions, the integrated current output over a certain time period may be detected and when that integrated value exceeds a certain percentage of rated capacity of the energy reservoir 3, for example, the fuel cell 2 may be boosted before the lower charge condition threshold is reached. It will be understood that the method of operation described herein is not limited to methanol fuel cells, but is suitable also for other similar fuels or fuel cells.

Although the invention has been described herein with reference to specific embodiments, many modifications and variations therein will readily occur to those skilled in the art. Accordingly, all such variations and modifications are included within the intended scope of the invention.

I claim:

1. A fuel cell arrangement comprising:
   a fuel cell having a methanol reformer and providing an electrical output;
   an electrical energy reservoir having an electrical output connected in parallel with the fuel cell electrical output;
   a charge condition sensor for the electrical energy reservoir;
   a control unit receiving output signals from the charge condition sensor and a drive parameter signal;
   the control unit being connected to the fuel cell so that it controls fuel cell operation as a function of the charge condition of the electrical energy reservoir; and
   a boost adjustor connected in parallel with the electrical outputs of the fuel cell and of the electrical energy reservoir for adapting the voltage output of the fuel cell to that of the electrical energy reservoir.

2. A fuel cell arrangement according to claim 1 wherein the electrical energy reservoir comprises a battery or a supercondenser.

3. A fuel cell arrangement according to claim 1 wherein the charge condition sensor comprises a current measuring instrument.

4. A fuel cell arrangement according to claim 3 wherein the current measuring instrument comprises a shunt or current converter.

5. A fuel cell arrangement according to claim 1 wherein the energy reservoir includes a temperature sensor providing an output signal to the control unit.

6. A motor vehicle comprising an electrical drive motor and a fuel cell arrangement according to claim 1.

7. A method of controlling the energy flow of a fuel cell arrangement having a fuel cell with a methanol reformer and providing an electrical output and an electrical energy reservoir connected in parallel, a charge condition sensor and a control unit, in which a device to be operated draws energy from at least one of the fuel cell and the energy reservoir, comprising the following steps:
   a) detecting continuously or intermittently, by the charge condition sensor, the charge condition of the electrical energy reservoir;
   b) transmitting the charge condition of the electrical energy reservoir to the control unit;
   c) controlling, by the control unit, the operating point of the fuel cell as a function of the charge condition of the electrical energy reservoir and
   d) adapting the voltage output of the fuel cell to that of the electrical energy reservoir;
   e) maintaining the operating point of the fuel cell unchanged until the charge condition of the electrical energy reservoir passes a first threshold value; and
   f) providing a drive parameter signal to the control unit.

8. A method according to claim 7 including reducing or terminating operation of the fuel cell when the charge condition of the electrical energy reservoir passes a second threshold value.

9. A method according to claim 8 wherein the control unit determines from the drive parameter signal operating situations in which operation of the fuel cell is switched off or increased independently of the charge condition of the electrical energy reservoir.

* * * * *